United States Patent
Kishen et al.

(10) Patent No.: US 7,831,513 B2
(45) Date of Patent: Nov. 9, 2010

(54) SYSTEMS AND METHODS FOR SOLICITING CUSTOMERS USING COMPUTER READABLE MEDIA

(75) Inventors: Ronald Francis Kishen, Glen Allen, VA (US); Nick Dumas-Brown, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 2263 days.

(21) Appl. No.: 10/300,753

(22) Filed: Nov. 21, 2002

(65) Prior Publication Data

US 2004/0103065 A1    May 27, 2004

(51) Int. Cl.
*G06F 21/00* (2006.01)
(52) U.S. Cl. .............................. 705/51; 705/50; 705/57
(58) Field of Classification Search .................... 705/51, 705/50, 57
See application file for complete search history.

(56) References Cited

U.S. PATENT DOCUMENTS

| | | | |
|---|---|---|---|
| 4,812,633 | A | 3/1989 | Vogelgesang et al. |
| 5,742,845 | A | 4/1998 | Wagner |
| 5,898,838 | A | 4/1999 | Wagner |
| 5,905,908 | A | 5/1999 | Wagner |
| 5,982,736 | A | 11/1999 | Pierson |
| D419,152 | S | 1/2000 | Lowenstein |
| 6,016,298 | A | 1/2000 | Fischer |
| 6,597,653 | B1 | 7/2003 | Burnett |
| 6,665,303 | B1 | 12/2003 | Saito et al. |
| 2002/0027837 | A1 | 3/2002 | Weber |
| 2002/0194476 | A1* | 12/2002 | Lewis et al. .................. 713/169 |
| 2003/0046222 | A1* | 3/2003 | Bard et al. ..................... 705/38 |
| 2004/0172339 | A1* | 9/2004 | Snelgrove et al. ............. 705/26 |
| 2008/0004949 | A1* | 1/2008 | Flake et al. ................... 705/14 |

(Continued)

FOREIGN PATENT DOCUMENTS

WO    WO 00/72649 A2    12/2000

(Continued)

OTHER PUBLICATIONS

CD-ROM-Works: Rink and Card CDs, downloaded from <http://www.cd-rom-works.com/cards_cd.htm> on Apr. 16, 2002, pp. 1-3.

(Continued)

*Primary Examiner*—Pierre E Elisca
(74) *Attorney, Agent, or Firm*—Finnegan, Henderson, Farabow, Garrett & Dunner, L.L.P.

(57) ABSTRACT

Systems and methods are provided for soliciting customers using solicitation media. The solicitation media distributed to customers may comprise computer readable media that stores information pertaining to offer(s) for one or more product(s) or service(s). The computer readable media may also be provided with logic or program instructions that cause the customer's computer to perform certain functions. By way of example, the functionality provided through the computer readable media may facilitate the selection of a product or service that is best suited for the customer's needs, as well as assist a customer to complete and/or submit an application or request for an offered product or service. In addition to serving as a solicitation tool, the computer readable media may also serve as a financial transaction card that is associated with a financial product offered to the customer, such as a credit card or debit card.

33 Claims, 9 Drawing Sheets

U.S. PATENT DOCUMENTS

2008/0243677 A1 * 10/2008 Hogg et al. .................. 705/37

FOREIGN PATENT DOCUMENTS

| WO | WO 01/56023 A1 | 8/2001 |
| WO | WO 01/95204 A1 | 12/2001 |

OTHER PUBLICATIONS

Butler Webmasters-Business Card CDs, downloaded from <http://www.butlerweb.com/promos/promo1.htm> on Apr. 16, 2002, pp. 1-2.

"First USA Launches 'Customizable' Visa Card," DMNews.com, dated Apr. 17, 2002, downloaded from <http://www.webprowire.com/cache/e/e38c894113c0d452aefda61821a27127> on Aug. 6, 2002, pp. 1-2.

* cited by examiner

SYSTEMS AND METHODS FOR SOLICITING CUSTOMERS USING COMPUTER READABLE MEDIA

BACKGROUND OF THE INVENTION

I. Field of the Invention

The present invention generally relates to solicitation media and to systems and methods for presenting offers to customers using such media. More particularly, the invention relates to systems and methods for soliciting customers using solicitation media that comprises computer readable media, such as optical compact disks (CDs), smart cards and other computer readable media.

II. Background and Material Information

Solicitation materials are used by businesses to offer product or services to customers. Traditionally, solicitation materials have been provided in the form of printed materials, such as flyers, letters, booklets, pamphlets and the like. Such materials are often distributed to customers using mass or targeted distribution techniques.

In recent years, other solicitation methods have emerged as a result of the proliferation of electronic networks and communications. For instance, offers may be presented to customers as part of an e-mail or through content on a Web page. When presented in electronic form, a solicitation may include a dynamic link to cause a browser on the customer's computer to load a specific Web page or to display an on-line line form to permit the customer to purchase the offered product or service.

Regardless of the form, solicitations typically include a description of the product or service that is offered, as well as relevant information on how to obtain or purchase the product or service. In certain cases, special offers may be presented to a customer to entice the customer to purchase or obtain the product or service. For example, a discounted price for purchasing a product may be offered to a customer if they respond within a predetermined time period. In other cases, a description of numerous product or service offerings may be provided to permit customers to select the product or service that best suits their needs.

Solicitation materials have been used in a wide range of business areas. One such area is the financial services and banking sectors. Banks, credit card issuers and other financial entities that operate in this space have used solicitations to encourage customers to apply for or acquire financial products and services. For instance, financial entities that issue credit cards have used solicitations to promote their financial products and to encourage customers to submit applications for new credit card accounts and/or related services. Such solicitations usually take the form of printed materials that are directly mailed to individuals. These solicitation materials may include an application or a toll-free number to permit a customer to submit or request a new credit card account. Some financial entities also promote their financial products and services over the Internet using, for example, banner advertisements or other content on a Web page.

Despite these approaches, solicitation methods suffer from one or more drawbacks. For example, many customers do not respond to printed or on-line solicitations due to privacy concerns. For instance, in the case of offers for financial products or services, a customer may be reluctant to provide personal credit or financial information as part of an application form. Moreover, for customers receiving electronic solicitations, privacy concerns related to the Internet and on-line activity often exacerbate the situation. In addition, many customers may conclude that an application process is too complex or time-consuming and, as a result, fail to respond.

Other factors can also contribute to a low response rate, such as the form of the solicitation. For instance, due to the high volume of advertisements and unsolicited mail (also referred to as "junk mail"), conventional solicitation materials sometimes fail to draw sufficient attention. Further, these materials are often ignored or simply disposed of with other junk mail. This scenario is particularly true for busy consumers, who have little or no time to review advertisements and junk mail.

In response, some business entities have attempted to create elaborate or multi-piece solicitation materials that contain colorful or creative inserts. Despite these attempts, however, response rates are always not boosted. Further, some customers may find the more elaborate materials to be too complex or time-consuming to sort through or read. Therefore, in many cases, the extra expense for creating and printing the solicitation materials is not justified.

SUMMARY OF THE INVENTION

Consistent with embodiments of the invention, systems and methods are provided for soliciting and presenting offers to customers. In accordance with one, embodiment, offers are presented to customers using solicitation media. The solicitation media may comprise computer readable media that contains information for presenting offers to customers for one or more types of products and/or services, including financial products or services. In addition, the computer readable media may be prepared with predetermined functionality and/or logic to provide a "no hassle" solicitation environment and improve customer response rate as compared to traditional solicitation approaches.

In accordance with an embodiment of the invention, systems and methods are provided for offering financial products to customers. In such systems and methods, solicitation media may be prepared for distribution to customers. The solicitation media may comprise computer readable media that stores information related to an offered financial product and program instructions to instruct a computer of the customer to perform one or more functions.

Consistent with an embodiment of the invention, a method is provided for soliciting a product to a customer. The method comprises: providing a computer readable medium, the computer readable medium storing information related to a plurality of product offerings and storing program instructions for selecting a product offering for a customer; enabling a computer to read the information stored in the computer readable medium and present the plurality of product offerings to the customer; further enabling the computer to gather at least one of segmentation and lifestyle information from the customer; configuring the program instructions stored in the computer readable medium to cause the computer to analyze the information gathered from the customer and identify at least one of the plurality of product offerings; and further enabling the computer to present the identified product offering to the customer.

In accordance with another embodiment of the invention, a method is provided for soliciting a customer. The method comprises: providing a computer readable medium, the computer readable medium storing information related to at least one financial product and program instructions for offering the financial product to a customer; configuring the program instructions stored in the computer readable medium to cause a computer to: present to the customer the offer for the at least one financial product; gather application information from the customer to enable the customer to apply for offered financial product, generate an original code that is representative of the application information gathered from the customer, and compress the original code into a compressed code using an encryption algorithm. The method further comprises: submitting the compressed code to a financial entity as part of a request from the customer for the offered financial product; after receiving the compressed code at the financial entity, decompressing the compressed code to reveal the original code and analyzing the original code to determine the application information from the customer; and analyzing the application information to determine whether to issue the offered financial product to the customer.

Consistent with yet another embodiment of the invention, a computer readable medium is provided for offering credit card products to customers. The computer readable medium may store program instructions for instructing a computer to perform a method of offering at least one credit card product to a customer, the method comprising: presenting an offer for at least one credit card product to the customer; receiving a request from the customer to apply for the offered credit card product; and in response to receiving the request for the customer, electronically submitting an application for the credit card product to a financial entity. Further, the computer readable medium may include a non-recordable surface with pre-assigned account information printed thereon so that the computer readable medium may function as a transaction card when an account for the offered credit card is issued to the customer using the pre-assigned account information.

Consistent with still another embodiment of the invention, a system is provided for soliciting a financial product to a customer. The system comprises a solicitation media generator for preparing a computer readable medium, the solicitation media generator being adapted to store on the computer readable medium solicitation information for at least one financial product and an application for requesting the financial product, and to form account indicia on a surface of the computer readable medium, the account indicia being associated with the at least one financial product. The system also includes: a distribution system for distributing the computer readable medium to a customer; means for receiving from the customer a request for the financial product, the request from the customer including application information submitted based on the application stored on the computer readable medium; means for processing the application information to determine whether to approve the customer's request for the financial product; and means for notifying the customer whether the request for the financial product is approved.

It is to be understood that both the foregoing general description and the following detailed description are exemplary and explanatory only, and should not be considered restrictive of the scope of the invention, as disclosed and claimed herein. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Figure 1:
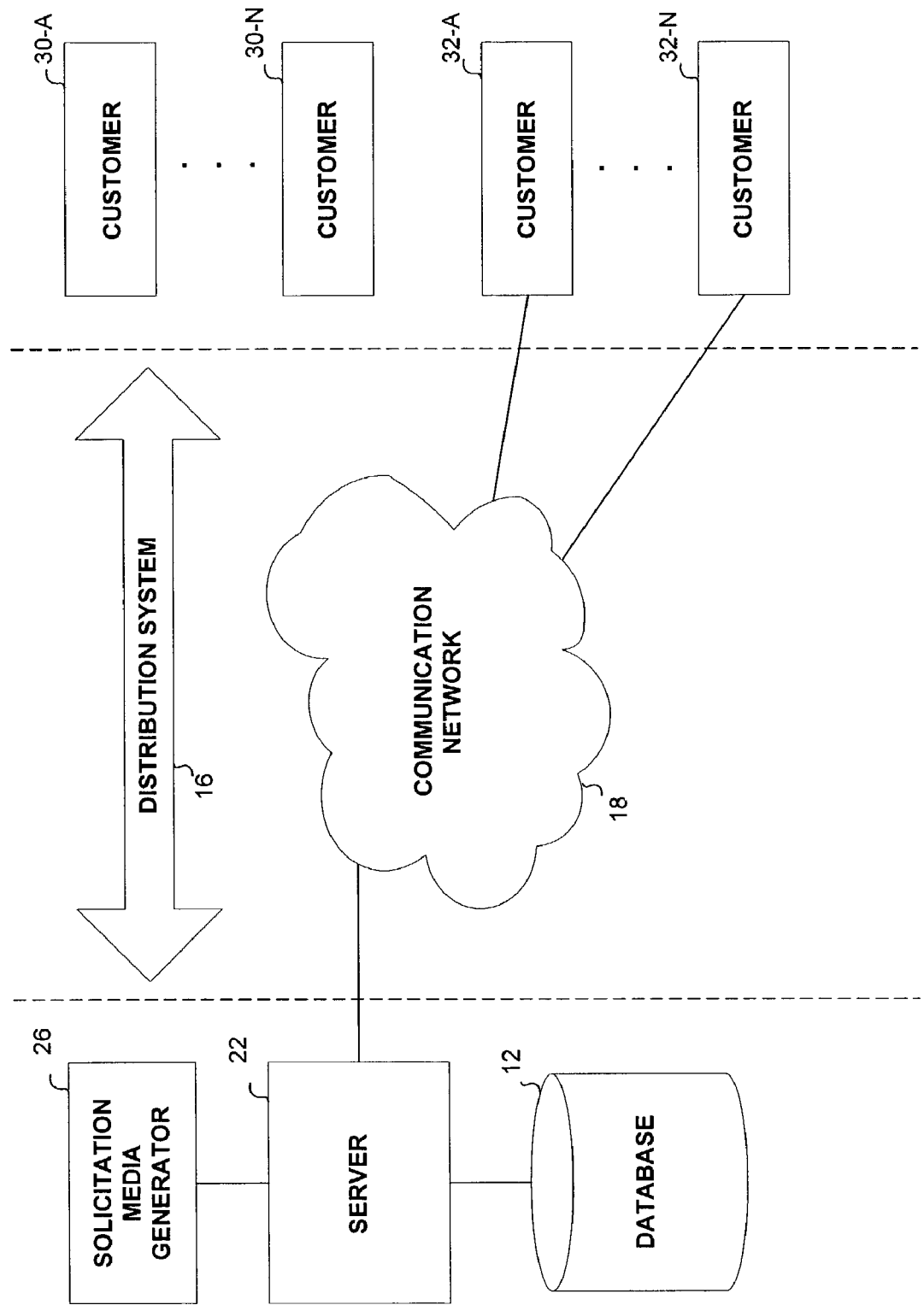
FIG. 1 illustrates an exemplary system environment, consistent with embodiments of the present invention.

Systems and methods consistent with embodiments of the present invention solicit customers using solicitation media that comprise computer readable media. The solicitation media may be used to offer customers various types of products and services, including financial products and/or services. Further, by incorporating interactive functionality and/or logic into the computer readable media, improved response rates can be achieved as compared to traditional solicitation approaches. For instance, software enabled functionality may be used to guide the customer in selecting a product or service that best suits their needs. The functionality of the solicitation media may also facilitate a customer to complete or submit an application for a new product or service. Moreover, the customer may be given a number of options for submitting an application for offered product(s) or service(s). By empowering the customer to control the solicitation process, including application review and submission, concerns over privacy are lessened.

Embodiments of the present invention are also directed to computer readable media that can serve as a solicitation tool for presenting offers to a customer and, thereafter, as a financial transaction card (such as a credit card) upon, for example, approving a customer's application or activating an account associated with the transaction card. Examples of computer readable media, consistent with embodiments of the invention, include optical compact disks (CDs), magnetic disks, smart cards, memory sticks, USB-compatible devices with memory capacity, devices incorporating beaming technology, and other types of computer readable media. Exemplary embodiments of computer readable media in the form of optical CDs are described below with reference to, for example, FIGS. 6 and 7.

As used herein, the term "computer" is not limited to personal computers, laptops, servers or workstations, but encompass any type of device with computing or processing capabilities. In addition, the usage of the terms "on" or "in" with reference to information or program instructions stored with the computer readable medium, are intended to be interchangeable and not restrictive as to the physical manner in which information or program instructions are stored with the computer readable medium. Further, the term "customer" is not limited to existing customers of an entity presenting the offer. Instead, the term "customer" encompasses past, future and/or potential customers of the entity soliciting its products and/or services.

Embodiments of the present invention may be implemented in various environments. Such environments may be specially constructed for performing processes and operations related to embodiments of the invention and/or they may include a general-purpose computer or computing platform selectively activated or reconfigured by program code to provide the necessary functionality. The systems and methods disclosed herein are not inherently related to any particular computer or other apparatus, and may be implemented by a suitable combination of hardware, software, and/or firmware. For example, various general-purpose machines may be used with programs written in accordance with teachings of the embodiments of the invention, or it may be more convenient to construct a specialized apparatus or system to perform the required methods and techniques.

Embodiments of the invention also relate to program instructions or code for performing various computer-implemented operations based on the methods and processes of embodiments of the invention. The media and program instructions may be those specially designed and constructed for the purposes of the embodiments of the invention, or they may be of the kind well known and available to those having skill in the computer software arts. Examples of program instructions include both machine code, such as produced by a compiler, and files containing a high level code that can be executed by the computer using an interpreter.

By way of a non-limiting example, FIG. 1 illustrates an exemplary system environment for implementing embodiments of the present invention. As shown in FIG. 1, the exemplary system environment includes a number of components, including a database 12, a server 22 and a solicitation media generator 26. These components may be owned or operated by an entity that offers products and/or services to customers. These customers may include customers 32-A to 32-N who have access to a communication network 18, as well as other customers 30-A to 30-N who do not have, or elect to use, network access. As further disclosed herein, communication network 18 may permit certain customers (such as customers 32-A to 32-N) to communicate with an entity for the purpose of responding to offers and/or requesting or applying for products and services offered by the entity.

Database 12, server 22 and solicitation media generator 26 may be implemented through any suitable combination of hardware, software and/or firmware. Such components may be directly or indirectly connected with one another, or provided as part of an integrated system. By way of non-limiting examples, the disclosed components may be implemented using one or more general-purpose computer(s), mainframe(s) or computing platform(s) selectively activated or reconfigured by program code to provide the necessary functionality. Further, one or more of these components may be outsourced to or operated by a third party that provides, for example, hosted database, applications and/or other services.

Database 12 may store any information or logic needed for implementing embodiments of the invention. For example, database 12 may store product and/or service information offered by an entity. Database 12 may also contain client information related to customers targeted by the entity, as well as pertinent information and/or logic for keeping track of generated solicitations. In the context of an entity that offers financial products or services, database 12 may store credit and/or financial history information for processing applications submitted by applications from customers. In one embodiment, database 12 stores client records and/or account information for customers that are solicited.

Consistent with an embodiment of the invention, database 12 may be implemented by various memory or storage devices, such as a high-density memory or storage device. Such a storage device may be implemented to provide persistent storage of data, and may be organized as a relational database. Further, database 12 may be directly connected or integrated with server 22, or it may be indirectly connected using, for example, a local area network (not shown). Also, while a single database is illustrated in FIG. 1, it is possible to distribute data residing in database 12 over various databases or storage devices.

Server 22 incorporates functionality for performing methods related to, embodiments of the invention. Such functionality may be provided through software and/or hardware configuration(s) residing in server 22. As further disclosed herein, sever 22 may be adapted to perform various functions including: analyzing client information; generating distribution lists for distributing solicitation media to customers; analyzing responses, orders and/or applications from customers for offered products and/or services; and/or other functions. In addition, server 22 may fulfill customer orders for products or services, generate or activate accounts (such as financial accounts) and/or generate messages or communications for customers.

To facilitate communication with customers, server 22 may be adapted to communicate via network 18. Communication network 18 may comprise a network or combination of networks to permit communication between customers 32-A to 32-N and server 22. By way of non-limiting example, network 18 may comprise public or private networks, such as the Internet or a private intranet, and such a network or combination of networks may comprise wired and/or wireless networks. In addition, server 22 may host or be connected to a separate server that hosts a Web site or set of Web pages that can be accessed by customers. In another embodiment, server 22 may comprise or be connected to an e-mail server for receiving electronic communications from customers via network 18.

Solicitation media generator 26 is adapted to generate solicitation media for distribution to customers. Consistent with embodiments of the invention, the solicitation media may comprise computer readable media. The computer readable media may store information related to solicitations or offers to be presented to customers. The computer readable media may also contain hardware, firmware or software-enabled logic to: facilitate the selection of product or service offerings; aid a customer in completing or generating a response to an offer; perform real-time decisioning; and/or perform other functions. In one embodiment, solicitation media generator 26 includes computer-based equipment for receiving instructions from server 22 or entered manually by an operator, and storing information and/or logic on each solicitation medium. Generator 26 may also include printing equipment for printing indicia on the surface of the solicitation medium and/or other materials that are distributed with the solicitation medium. The instructions received by generator 26 may specify the type or content of information and/or logic to be stored on the solicitation medium, as well as contain distribution information such as the quantity of solicitation media to be generated and a list of customer names and addresses to which the solicitation media is to be sent.

Consistent with an embodiment of the invention, solicitation media generator 26 may be an internal system or generator of the entity providing the solicitation to customers for product(s) or service(s). Alternatively, some or all of the functions performed by solicitation media generator 26 may be outsourced to a third party. For example, an entity may contract with one or more suppliers to obtain blank computer readable media to generate the solicitations. In addition, third party suppliers or vendors may be used to store information or software-based logic in the media, and/or print visible indicia or information on the surface of the media. Packaging and labeling may also be outsourced or performed in-house by the entity distributing the solicitations to customers.

As further illustrated in FIG. 1, a distribution system 16 may be provided. Distribution system 16 may be used to distribute the solicitation media to customers 30A to 30-N and 32-A to 32-N. In one embodiment, distribution system 16 comprises a public or conventional mail system such as that provided by the U.S. Postal Service for mailing the solicitation media to customers. In another embodiment, distribution system 16 includes a courier system or a private delivery system for sending the solicitation media to customers. In the above-noted examples, a distribution list may be used containing the names and addresses of customers that are targeted to receive a solicitation. In another embodiment, mass distribution techniques may be employed. In such a case, distribution system 16 may include at least one of the above-noted mail delivery systems and/or other distribution channels such as kiosks, stands, inserts, drop locations and the like.

In the embodiment of FIG. 1, customers who receive solicitation media in the form of a computer readable medium, may use a personal computer, workstation, laptop or other suitable device to review the solicitation information stored on the medium. Decision logic stored in the medium may also be used by a customer to make a decision regarding the offered product(s) or service(s), as well as to complete an order or submit an application for a product or service. For those customers with network access, communication network 18 may be used to submit an order or application to server 22. Alternatively, a customer may use other means for communicating with the entity that presented the offer, such as calling a customer representative and/or mailing a printed application or order to the entity.

Figure 2:
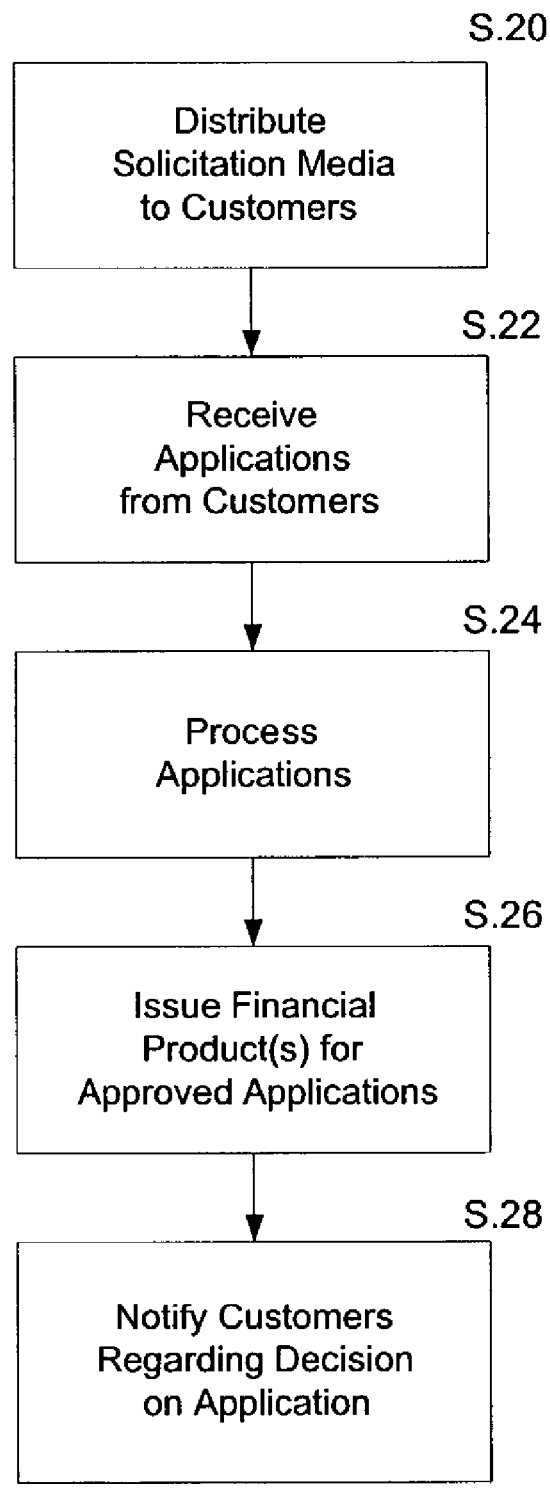
FIG. 2 is a flowchart of an exemplary method for soliciting customers using computer readable media, consistent with an embodiment of the present invention.

FIG. 2 illustrates a flowchart of an exemplary method for soliciting customers. Consistent with an embodiment of the present invention, solicitation media may be used by an entity to offer product(s) or service(s) to customers. The solicitation media may comprise computer readable media that is capable of storing information and/or functional logic. For purposes of illustration, the embodiment of FIG. 2 will be described with reference to an entity that offers financial product(s) to customers. Embodiments of the invention, however, are not limited to the solicitation of financial products and may be adapted to permit the solicitation of any number or type of product(s) and service(s).

As shown FIG. 2, the process begins by distributing the solicitation media to customers (step S.20). As part of this step, a distribution system, such as distribution system 16 of FIG. 1, may be used to send the solicitation media to customers. In one embodiment, the distribution of the media is performed by mail or courier delivery. In another embodiment, distribution is achieved by using kiosks, stands or designated drop locations. In either case, the solicitation media may be provided to customers using targeted or mass distribution techniques. For targeted distribution, a distribution list with the names and/or addresses of targeted customers may be utilized.

As stated above, the solicitation media may comprise computer readable media for storing pertinent information and/or logic for soliciting customers. The solicitation may relate to an offer for a specific product or service, or may comprise a set of product or service offerings. Examples of computer readable media for the solicitation include, for instance, optical compact disks (CDs), magnetic disks, smart cards, memory sticks, USB-compatible devices with memory capacity, devices incorporating beaming technology, and other types of computer readable media. In one embodiment, the solicitation media may also comprise packaging and/or printed materials that are distributed with the computer readable media. The packaging may comprise a shipping or address label, as well as a protective jacket, envelope or other type of casing. The printed materials may comprise a letter, flyer, pamphlet and/or other printed materials. Such materials may include printed text providing an introduction, a set of instructions, a description of limitations or restrictions and/or other information to facilitate a customer's review of the solicitation and computer readable medium.

By way of non-limiting example, assume a solicitation medium includes a computer readable medium with information related to an offer for one or more financial products from an entity, such as a financial institution or credit card company. A customer receiving the solicitation may display and review the information stored in the computer readable media by using a personal computer, workstation, laptop or other suitable device. For instance, a solicitation provided on an optical CD may be viewed by reading the CD with an optical disk drive or CD-ROM drive of a computer. In one embodiment, logic may also be stored in the computer readable media to facilitate the display of information and/or to aid a customer in selecting a product. With an optical CD or any other type of computer readable medium with high-storage capacity, multi-media presentations are also possible for presenting offers through audio, images and/or text.

In the context of solicited financial product(s), a customer receiving an offer may be required to submit an application before they can receive the product. For example, to determine if a customer qualifies for a credit card or loan, a financial entity may use the application information from a customer to analyze their financial history and/or credit rating. Accordingly, as part of the exemplary method of FIG. 2, application information may be received from customers who respond to the solicitation (step S.22). The application information may be received through one or more communication channels, such as by standard mail, telephone or through a communication network. For instance, customers 32-A to 32-N may submit application information to server 22 using communication network 18. Such communication may be achieved by, for example, a direct dial-up or network connection with server 22, or a secured Internet connection and a Web site hosted on server 22 or hosted on another server device that is capable of communicating with server 22. Alternatively, other customers (such as customers 30-A to 30-N) may elect to submit the application information by calling a service department of the financial entity, or printing and submitting a completed application to the financial entity using standard mail or a courier.

In one embodiment, the computer readable media may include logic to aid a customer in completing an application. The logic may be implemented through any suitable combination of hardware, firmware and/or software. In the case of software-enabled logic, the computer readable media may store program instructions that are executed by a customer's computer to provided the necessary functionality. For example, functionality may be provided to facilitate the completion of the application with information confirmed or entered by the customer. Information for the application may include pre-stored information, such as the customer's name, address and/or other publicly accessible information. Information entered by the customer may be facilitated through a series of questions or prompts to the customers that are generated by the logic of the computer readable media. In response to questions, the customer may enter answers that are stored and later used, for example, to fill or complete an application.

Referring again to FIG. 2, applications from customers that respond to the solicitation are processed (step S.24). As stated above, financial product(s) may require submission of an application. Further, applications may require approval by the entity before a financial product is issued. For example, a customer may be required to submit an application with detailed information before a new credit card or loan is approved. The processing of applications may be performed by server 22 (FIG. 1) and include standard processing, such as financial history and credit analysis of a customer. To facilitate this analysis, property, tax and/or other public records may be analyzed, as well as information from one or more major credit bureaus (e.g., Equifax, TransUnion and/or Experian).

For applications that are approved, the requested financial product(s) may be issued to the customer (step S.26). In one embodiment, the financial product(s) issued for a customer may depend on the product(s) offered in the solicitation medium and requested by a customer through an application. If a customer's application is denied for reasons such as insufficient credit, the financial entity may deny and refuse to issue the requested financial product(s). In another embodiment, a customer may be pre-approved for a financial product and analysis of a customer's application may be required to confirm the customer's status and/or to determine terms of the financial product, such as a credit limit, a loan amount, an interest rate, etc.

The decision on each customer's application (e.g., approved or denied, including approval of a particular financial product determined to be appropriate for the customer) may be communicated to the customer (step S.28). Such notification may be achieved through one or more communications channels, such as by standard mail, telephone or communication via network 18. In one embodiment, the customer may designate a communication channel of preference for receiving notification. In addition to indicating the status on the application, the notification may provide other information to the customer. For example, if a customer's application is approved, the notification may also provide information concerning the issued financial product(s), such as account number, activation requirement(s), general terms and conditions, etc. A transaction card may also be sent to the customer, such as a plastic credit card, to permit the customer to perform transactions. If the customer's application is denied, the notification may indicate, for instance, the reasons why the application was denied. Alternatively, or additionally, the denial notification may suggest or present other financial product(s) for which the customer may qualify.

In one embodiment, the solicitation media is used not only as a medium for soliciting products or services, but also capable of being used as an instrument related to the product(s) or service(s). For instance, in the context of financial product(s) and service(s), the solicitation medium may serve as a financial transaction card or tool after a customer's application is approved. Thus, for purposes of illustration, assume that a customer applied for a new credit card. If the customer's application is approved, the solicitation medium may be activated so that it can be used as a credit card. Activation may be achieved through various approaches, including linking or associating a code or number assigned to the card with an account issued by the financial entity. An exemplary embodiment of a solicitation medium that can also serve as a financial transaction card is disclosed herein with reference to FIG. 7.

While the embodiment of FIG. 2 has been described in relation to the processing an application from a customer for a financial product, the exemplary method may be modified for other products, services or needs. For example, a financial product or service (such as a savings or checking account) may not require approval. In such a case, a customer may only be required to send a notification indicating that the customer has accepted or elected the financial product or service. For other types of products or services (such as merchandise or a magazine subscription), a customer may only be required to submit an order form. Such an order form may require the customer to indicate the quantity, type and/or other specifics related to the ordered product(s) or service(s). In one embodiment, the order form may serve as a binding contract between the entity and customer for ordering products or services and/or require the customer to provide billing and shipping information.

Figure 3:
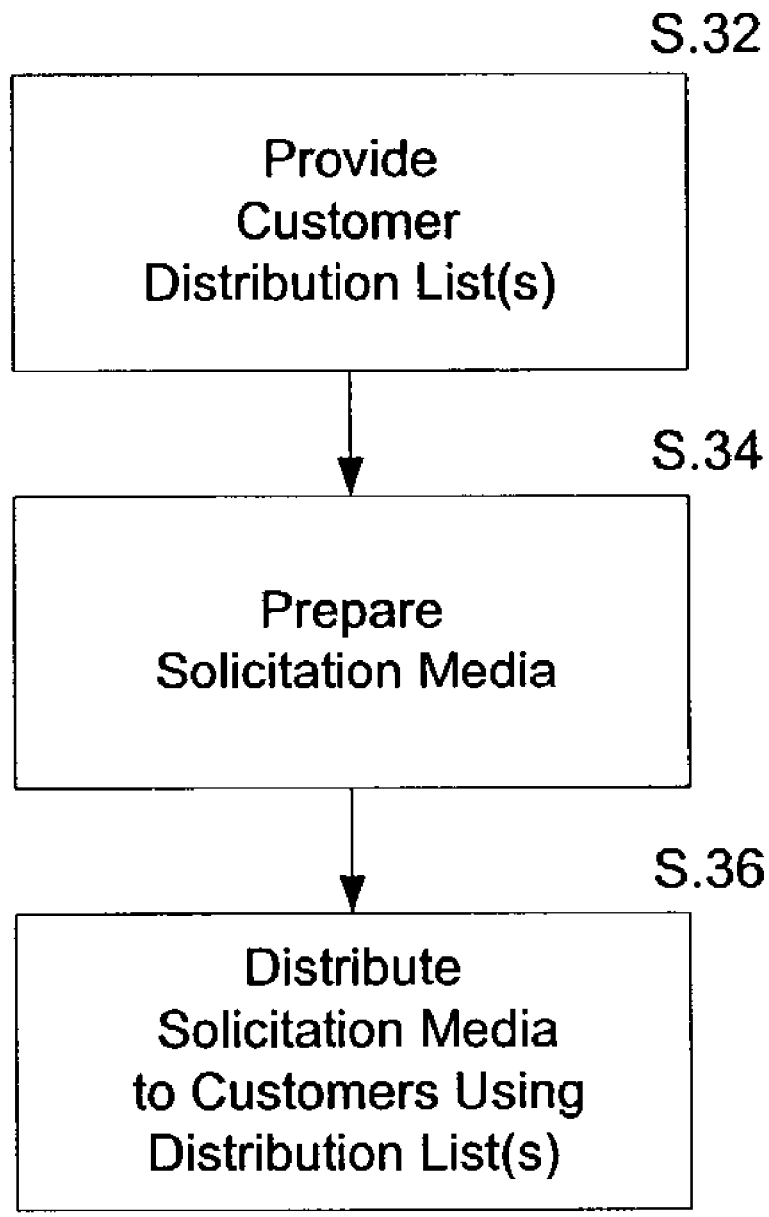
FIG. 3 is a flowchart of an exemplary method for preparing and sending solicitation media to customers, consistent with another embodiment of the present invention.

FIG. 3 illustrates a flowchart of an exemplary method for preparing and sending solicitation media to customers, consistent with an embodiment of the present invention. The exemplary method of FIG. 3 may used with systems and methods for soliciting customers with solicitation media. For example, the embodiment of FIG. 3 may be implemented as part of a method for soliciting customers, such as the exemplary method of FIG. 2.

As illustrated in FIG. 3, a customer mailing list is provided (step S.32). The mailing list may include the name and addresses of each customer who will receive the solicitation. One or more mailing lists may be provided depending on the needs of the entity. For example, separate mailing lists may be provided for distributions occurring on different dates or separate lists may be provided for each geographic region to be targeted. By way of a non-limiting example, the mailing list may be generated by server 22 (FIG. 1) using conventional analytical or statistical techniques to create a target or mass distribution list. Such lists may be specifically develop to attract new customers or to offer product(s) or service(s) to existing customers. In one embodiment, conventional analytical techniques are used to analyze customer information or records to identify customers who match a predetermined customer profile for a product or service offering. Such profiles may be defined by, for example, a customer's age, address, education, marital status, employment status, credit score, and/or liabilities, etc. In another embodiment, conventional statistical models are used to analyze customer information in order to identify customers who are likely to respond to a particular product or service offering. In still another embodiment, mailing list(s) are purchased from a third party such as a marketing research group or other entity.

While the embodiment of FIG. 3 is described with reference to a mailing list, any type of distribution list may be provided. Therefore, in addition to providing a list for mailing the solicitation media using standard mail or a courier, other distribution lists may be generated for distributing the media using, for example, kiosks, stands, inserts, drop locations and the like. In such cases, the lists may comprise one or more specific addresses corresponding to, for example, the identified kiosk(s), stand(s), or drop location(s), and other information such as the quantity to provided at each location and/or the names of persons who are authorized to receive the solicitation media at each location.

Before distribution, the solicitation media must be prepared (step S.34). While the preparation of the solicitation media (step S.34) is illustrated in FIG. 3 as being performed before providing the mailing list(s) (step S.32), the order to these steps may be reversed or steps S.32 and S.34 may be performed substantially in parallel or simultaneously. To prepare the solicitation media, a solicitation media generator such as generator 26 (FIG. 1) may be used. Alternatively, the preparation of the solicitation media may be outsourced in whole or in part to a third party.

Consistent with embodiments of the invention, the solicitation media may be prepared using computer readable media. The computer readable media may store information for presenting offers for product(s) or service(s). The computer readable media may also be provided with logic for facilitating the presentation of information, completing and submitting applications or orders from customers, and/or performing other functions. The solicitation media may also include packaging and/or printed materials that are to be distributed with the computer readable media. The packaging may comprise a shipping or address label, as well as a protective jacket, envelope or other type of casing for the computer readable media. The printed materials may comprise a letter, flyer, pamphlet and/or other printed materials. Such materials may include printed text for providing an introduction, a set of instructions, a description of limitations or restrictions and/or other information to facilitate a customer's review of the solicitation and computer readable media. Alternatively, or in addition, such information may be stored on the computer readable media along with the solicitation.

In one embodiment, the information stored on the computer readable media includes text and/or graphics for presenting offers for product(s) or service(s). By way of non-limiting example, the offered product(s) may be a single product or a plurality of products from which the customer may select. Such information may be stored in conventional file formats that can be read and/or processed by applications residing on a computer or other suitable devices to display or otherwise present the information of the customer. Examples of file formats include: conventional word processing or text file formats including ".doc" or ".txt"; conventional image file formats including GIFF, TIFF or PDF; and conventional file formats such as ".html" files that can be processed by a Web browser. In one embodiment, the information stored on the computer readable media also includes audio and/or other content to provide a more robust presentation of offers to customers. By way of non-limiting example, the computer readable media may store: video files such as JPEG or MPEG files; audio files such as conventional CD-audio files; and music files such as MP3 files.

Other types of information may also be stored on the computer readable media. For example, as indicated above, information may be stored to provide an introduction, a set of instructions, and/or an explanation of the terms or conditions related to the offered products of services. By way of a non-limiting example, assume that an offer for a new credit card is to be provided to customers. In this example, the computer readable media may store information concerning the solicitation for the new credit card product, as well as the terms or conditions related to the credit card product, such as the APR, annual fee, reward program(s), late penalty fee(s), etc. In addition, instructions may also be stored on the computer readable media to instruct a customer how to apply for the offered credit card product. Other information can also be stored on the media, such as advertisements, promotions, coupons, discounts, cross-sells, credit card options or programs, etc.

The computer readable media may also be implemented with logic to provide certain functionality. Such logic may be provided through any suitable combination of hardware, firmware and/or software. For example, if the computer readable media is prepared using optical CDs, the logic may be enabled with software or program instructions stored on the CD. The functionality provided through the logic may be designed for specific tasks, such as facilitating a customer to select the product(s) best suited for their needs or automating the application submission process for a customer.

By way of non-limiting example, assume that the solicitation presents information concerning a plurality of available credit card products. In this example, logic may be provided to cause the customer's computer to generate a set of questions and to prompt the customer to provide answers to those questions. Based on the answers provided by the customer, the best suited credit card product may be identified and presented to the customer. The customer could then be given an option to request or apply for this card. Additional logic could be provided for guiding the customer through the application submission process, using the customer's answers to pre-fill information in the application and/or prompting the customer for information necessary to complete the application. In one embodiment, information pre-stored on the computer readable media during preparation, such as customer name and address, may be used to automatically complete an application. Any pre-fill information may be subject to review by the customer prior to submission.

In one embodiment, the solicitation media is prepared with a time expiration routine or code that renders the media invalid or unreadable after a predetermined time period. Such a feature may be convenient for offers that are time sensitive, such as pre-approved financial account offers or offers requiring that the customer respond within a predetermined time period to receive, for example, a discount or incentive. By way of further example, the time expiration routine may read a system clock of the customer's computer and determine if a predetermined period (e.g., 30, 60 or 90 days) has expired. If the time period has expired, then the media is rendered invalid or unreadable. In another embodiment, the solicitation media may a use expiration routine or code that renders the media invalid or unreadable after predetermined number of uses by the customer. For instance, the routine or code may determine the value of a counter which keeps track of the number of times the solicitation information has been accessed or read from the computer readable medium.

Using the mailing list(s), the solicitation media is sent to customers (step S.36). A distribution system such as distribution system 16 (FIG. 1) can be used to distribute the prepared solicitation media. As indicated above, distribution may be achieved using standard mail or a courier to deliver the solicitation medium to each customer on a mailing list. Other forms of distribution are also possible, such as distribution through kiosks, stands, inserts, drop locations, etc.

Figure 4:
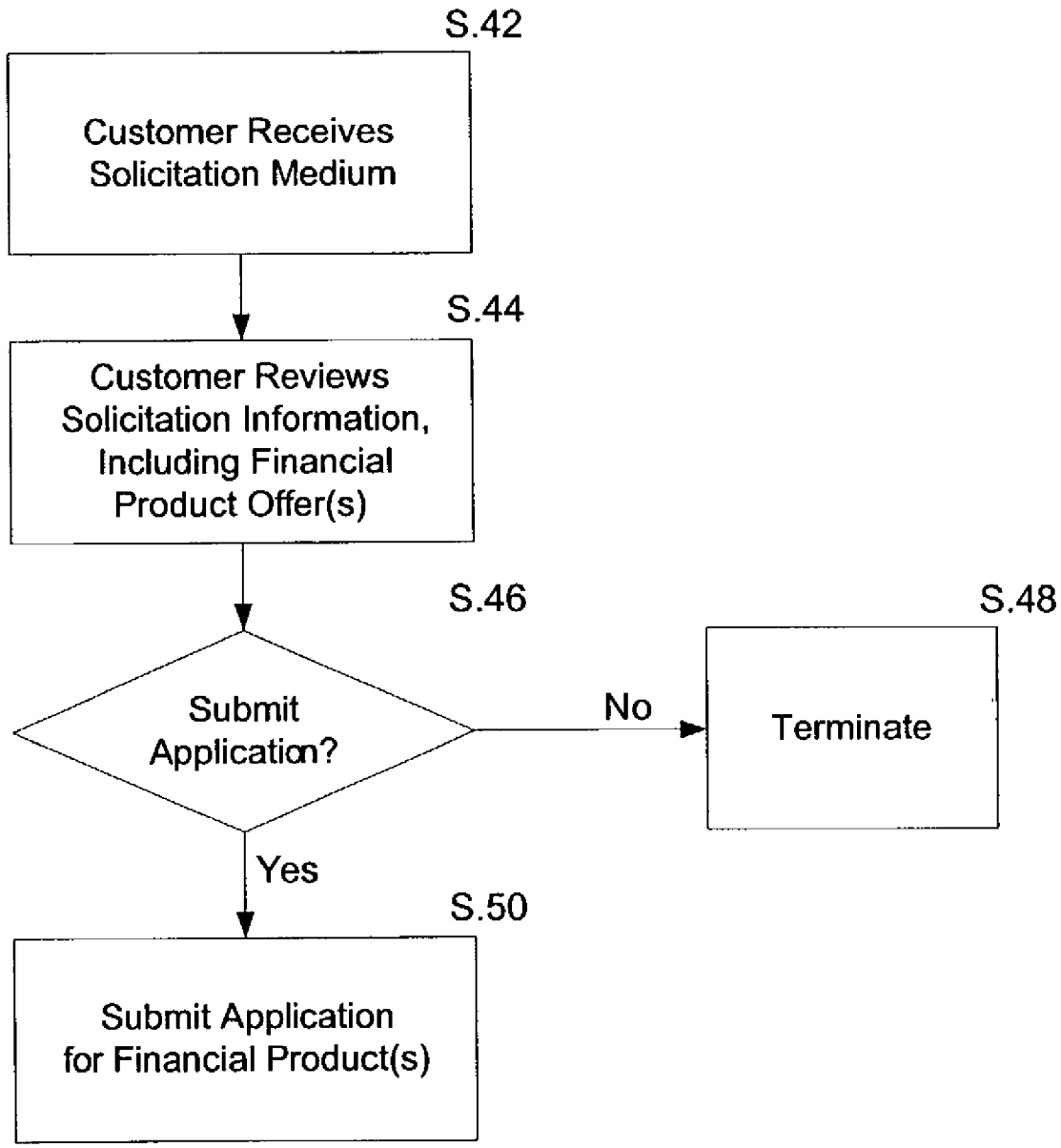
FIG. 4 is a flowchart of an exemplary method related to customer review and response to solicitation media, consistent with an embodiment of the present invention.

FIG. 4 illustrates a flowchart of an exemplary method related to customer review and response to solicitation media, consistent with an embodiment of the present invention. The exemplary method of FIG. 4 may used with systems and methods for soliciting customers with computer readable media. For example, the embodiment of FIG. 4 may be implemented as part of a method for soliciting customers, such as the exemplary method of FIG. 2. While the embodiment of FIG. 4 is described in connection with offering financial product(s), the exemplary method may be adapted for soliciting other types of products or any type of service.

The process begins when a customer receives the solicitation medium (step S.42). The solicitation medium may be delivered to a customer using a distribution system, such as distribution system 16. When a customer receives the solicitation medium, the customer may review the solicitation information (step S.42). The solicitation information, including offer(s) for financial product(s), may be reviewed by a customer by accessing the information stored on the solicitation medium using a computer or other suitable device. If, for example, the solicitation medium is implemented using a computer readable medium such as an optical CD, the optical CD may be placed into a CD-ROM drive of a computer. Conventional applications stored on the customer's computer, such as a word processing program, a Web browser, or an image viewer, may then display the information or content to the customer based on the data stored on the optical CD. If audio or image data is provided on the optical CD, then the audio or image content may also be presented to the customer.

In one embodiment, a customer may review printed materials that are sent with the computer readable medium. The printed materials may provide an introduction, a set of instructions and/or a general overview concerning the solicitation embodied in the computer readable medium. In another embodiment, the customer reviews all of the information contained in the computer readable medium, including an introduction, set of instructions, etc. and the solicitation information for the financial product(s).

To verify that the solicitation medium is being reviewed by the right person, one or more security features may be provided with the solicitation medium. For instance, in accordance with one embodiment, a set of questions may be presented to verify the identity of the customer. Such questions may require an individual to know certain personal information such as: the maiden name of the customer's mother; the closest street intersecting the customer's street address; and/ or the customer's past employer(s), etc. If the individual reviewing the solicitation medium can not properly answer all questions, then the medium may be rendered invalid or unreadable. Alternatively, the individual may be prompted to access a Web site or contact a service representation by, for example, phone or e-mail, in order to seek product information or request an application, etc.

After reviewing the financial product offer(s), the customer may decide whether to submit an application (step S.46). If the customer decides to submit an application (step S.46; Yes), then an application may be prepared and submitted (step S.50). If the customer does not want to respond to the offer (step S.46; No), then the process terminates (step S.48). In one embodiment, the customer may be given the option to reconsider his/her decision concerning the offer and submit an application at a later time. In such a case, the computer readable medium may be provided with expiration logic that renders the computer readable medium invalid or unreadable after a predetermined time or number of uses. In one configuration, the computer readable medium may be configured to allow a customer a predetermined number of opportunities (e.g., once, twice, three times, etc.) to review the solicitation, such that the customer has only the predetermined number of opportunities to decide whether or not to submit an application.

If the customer decides to submit an application (step S.46; Yes), logic embodied in the computer readable medium may facilitate entry and completion of an application for the offered financial product(s). As disclosed herein, certain portions of the application may be automatically completed using customer information pre-stored on the computer readable medium and/or based on answers provided by the customer. Pre-stored client information (such as name, address, etc.) may be gathered from client records maintained by the entity or information from one or more sources, such as major credit bureaus. Answers to questions may be collected from a customer during, for example, an identity verification session, a general survey session and/or an application filing process. In addition, if the computer readable medium is provided with logic to help a customer select the best suited financial product(s), the answers provided by a customer during a product selection session may be used to pre-fill or automatically complete the application. Any information filled into the application may be subject to review and approval by the customer before submission of the application.

To submit an application for the offered financial product(s) (step S.50), one or more submission options may be available to a customer. For example, the customer may be given the option to print an application and submit the application to the financial entity using standard mail or a courier. This option may be attractive to customers (such as customers 30-A to 30N in FIG. 1) who do not have access to or wish to use electronic submission through, for example, communication network 18. Before printing the application, the application may be pre-filled with information previously stored on the computer readable medium or collected during an interactive question and answer session with the customer. As part of this process, a customer may review the application information on a display of their computer to confirm and/or provide all of the necessary application information. The completed application may then be printed using a printer connected to the customer's computer and submitted to the financial entity. In one configuration, the computer readable medium is provided as part of a solicitation package that includes a pre-paid postage envelope for submitting the application by mail.

Other application submission options may be provided to customer. For instance, in another embodiment, the computer readable medium may provide a telephone number (such as a 1-800 or other toll free number) for calling a service representative and submitting application information or requesting a financial product. In such a case, the service representative may orally collect information from the customer during a phone session. The collected information may be submitted for processing by server 22 to permit the customer's application or request for the financial product to be reviewed.

To facilitate the submission of application information with a service representative, the computer readable medium may include logic for generating a code that can be processed to determine the identity of the customer and/or the answers provided by the customer to questions related to the offer or solicitation. Such a code may include a number of code portions, such as a client code portion that uniquely identifies the customer and one or more response code portions that are indicative of the responses provided by the customer. In one configuration, a compression or encryption routine is executed based on program instructions on the computer readable medium to compress the original code (such as a 30 bit code) into a compressed code (such as a 15-20 bit code). For example, the code "JohnSmith1311raintreeDrRichmond VA23229yesyesnodogsskiing$120000professornoyes" could be converted into the compressed code "12Wdsjh766%4$22 cmlxxsr", which later could be uncompressed to its original form. For this purpose, conventional compression or encryption routines may be employed, such as conventional 128 bit encryption techniques, as well as logical rules based encryption techniques. The compressed code may be displayed to the customer so that it can be orally given to the service representative during a call. The compressed code may then be entered into a computer and decompressed or decrypted to reveal the original code. The compressed code could also be transmitted over network 18 or submitted via distribution system 16 with reduced risk of information theft for the customer and the company. In either case, the original code can be determined and forwarded to server 22 for processing to determine the identity of the customer and analyze the pertinent application information.

As another option for submitting an application, the customer may be permitted to submit the application electronically. For instance, the customer may submit their application by electronic communication to server 22 using a communication network such as communication network 18. In one configuration, a customer may submit the application as part of an e-mail or an attached file to an e-mail to server 22. Alternatively, the customer may access a Web site using communication network 18 to provide application information on-line that is forwarded and analyzed by server 22. As soon as server 22 receives the application information, the customer's request may be processed and a determination may be made whether to approve or deny the application. Such processing may be performed by server 22 to provide substantially or virtually real-time decisioning on the application for the financial product.

Figure 5:
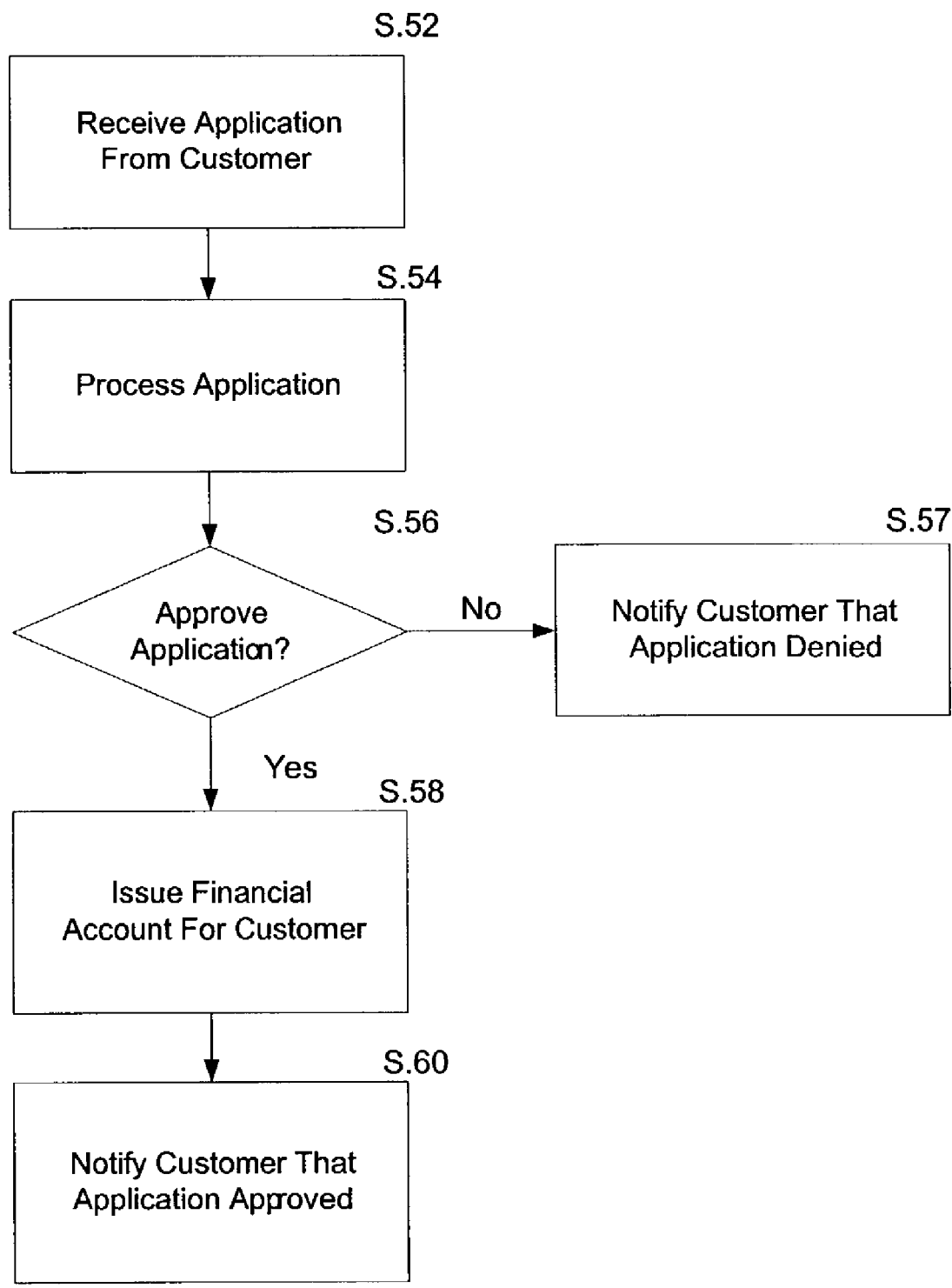
FIG. 5 is a flowchart of an exemplary method for reviewing a customer's response and processing an application for an offered product, such as a financial product.

Consistent with an embodiment of the invention, FIG. 5 is a flowchart of an exemplary method for reviewing a customer's response and processing an application for a financial product. Generally, the process begins when application information is received from a customer (step S.52). As disclosed herein, a customer may submit an application through one or more ways, such as by mail, telephone or electronically over a communication network. With the application information, the customer's request for the offered financial product is processed (step S.54). Processing of applications from customers may be performed by a server, such as server 22 in the exemplary embodiment of FIG. 1. As part of this process, the customer's financial history and credit may be reviewed by server 22 to determine if the customer qualifies for the financial product. Based on the analysis of the application information, a decision is made whether to approve or deny the application (step S.56). If the application is denied, the customer is notified of the denial (step S.57). If the application is approved, the financial product is issued for the customer (step S.58). By way of example, if the financial product is a credit card, a credit card account may be established or activated for the customer.

After the new account is established, the customer is notified that the application is approved and that the new account has been issued (step S.60). Such notification may include information such as the account number, the terms and conditions for the new account, etc. By way of example, assume that the financial product is a credit card. In addition to establishing a new credit card account, a financial entity may send the customer a transaction card, such as a plastic credit card member, that can be used to perform transactions with the new account. In another embodiment, the solicitation medium may serve as a transaction card, thus obviating the need to issue a separate plastic card member. In such a case, the solicitation medium may be prepared with account indicia and/or other fields to permit the medium to serve as a transaction card upon approval of the customer's application. For example, if the solicitation medium comprises a computer readable medium such as an optical CD, the optical CD may be prepared with indicia and features normally provided with a conventional credit card member, such as a printed field with the company name of the account issuer and/or account indicia (such as customer name and/or account number). To facilitate transactions, the optical CD can also be provided with a magnetic strip and a customer signature strip. An exemplary embodiment of a optical CD that can serve both as a solicitation medium and a transaction card is described below with reference to FIG. 7.

To prepare the solicitation medium so that it may be later used as a financial transaction card, the customer's name, a pre-assigned account number and/or other information may be printed on the surface of the media (such as the non-recordable side of an optical CD). A magnetic strip and/or signature strip may also be formed or provided on the surface of the medium. In one embodiment, the magnetic strip may store the pre-assigned account number, and a customer may place their signature in the signature strip once the financial product is approved or issued. When the customer's application is approved, the pre-assigned account number may be used to create a new account or the account number may be linked with a new account created by the financial entity. Other methods and techniques may also be employed. For example, if an account must be created when the account number is pre-assigned, then the parameters for the account (such as the account type, available credit line, interest rate, etc.) may be set to default or predicted values at the time that the solicitation media is issued. When an application from the customer is approved, the account parameters may be adjusted, as needed, to reflect the actual credit card product that was pre-approved for the customer. In other configurations, the credit card product may pre-approved such that acceptance by the customer is only required and, therefore, later adjustment to the account parameters is not needed.

As disclosed herein, the solicitation medium may comprise a computer readable medium. One example of a computer readable medium that can be used, consistent with embodiments of the invention, is a optical CD. By way of non-limiting example, FIG. 6 illustrates an exemplary solicitation medium in the form of a optical CD 60.

Conventional optical CDs have a large storage capacity and, thus, can advantageously store a wide array of content (text, images or graphics, audio, etc.) for presenting solicitations to customer. The large storage capacity of optical CDs also facilitates the storage of software-enabled functionality to enhance the solicitation and application process. Further, the unit cost of a CD is inexpensive.

Figure 6:
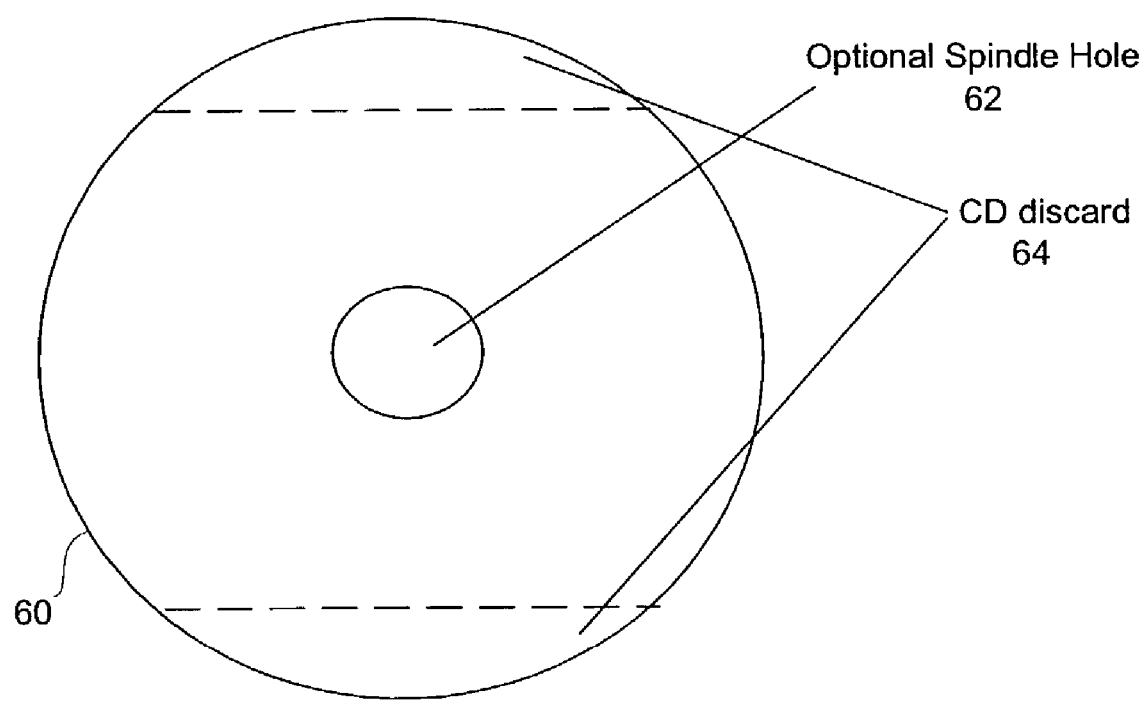
FIG. 6 illustrates an exemplary solicitation medium in the form of an optical CD.

Conventional optical CDs, such as that illustrated in FIG. 6, can be read by most standard CD-ROM drives. Typically, one surface of the optical CD contains recorded information that can be read by the CD-ROM device. The other surface of the optical CD is usually not recordable or readable, and may be used for printing labels, images, or other indicia. Optical CDs may be recordable once and readable an unlimited number of times. Alternatively, an optical CD may be rewritable, permitting data to be stored onto the CD many times. In accordance with an embodiment of the invention, the optical CD used to prepare the solicitation medium is a recordable CD, so as to permit information to be stored on the CD once and, thereafter, to be read but not re-recorded or altered after the solicitation medium is prepared. In another embodiment, the CD may be prepared as a rewritable medium, permitting information to be stored on the CD after distribution to customers. Such a feature may be useful in cases where, for example, the CD serves as a financial transaction after activating an account for the customer. With a rewritable CD, account information and/or financial transaction information may be advantageously stored on the CD for the customer.

To prepare the solicitation medium, a standard optical CD may be provided which is, for example, circular in form with an outer diameter of approximately 120 mm. As illustrated in FIG. 6, optical CD 60 may be provided with a center hole or spindle 62. Spindle hole 62 may be provided to center the optical CD 60 in a CR-ROM drive. However, with most tray or carriage-type CD drives, spindle hole 62 may be made optional and/or eliminated so long as the shape of optical CD 60 is substantially symmetrical. Thus, optical CD 60 may be formed without a center hole 62 or may be provided with a plug that fills the void of center hole 62. Symmetrically shaped CDs can be provided by die cutting certain excess CD portions, such as discard portions 64 in FIG. 6. Alternatively, the optical CD may be injected molded into a particular form. In the example of FIG. 6, a circular CD is shown as well as an alternate form (outline with dashed lines) that comprises two parallel straight edges and a set of opposing edges that are equally curved.

In recent years, card or mini CDs have been made available that are fully compliant with ISO 9660 and other CD standards. These CDs are substantially smaller in size than conventional, optical CDs and can fit into a customer's wallet. The card or mini CDs are symmetrical in shape (including those similar in shape to that represented in the example of FIG. 7) and can store approximately 50 Mb of data. Consistent with an embodiment of the invention, card or mini CDs may be used to provide solicitation media to customers.

Figure 7:
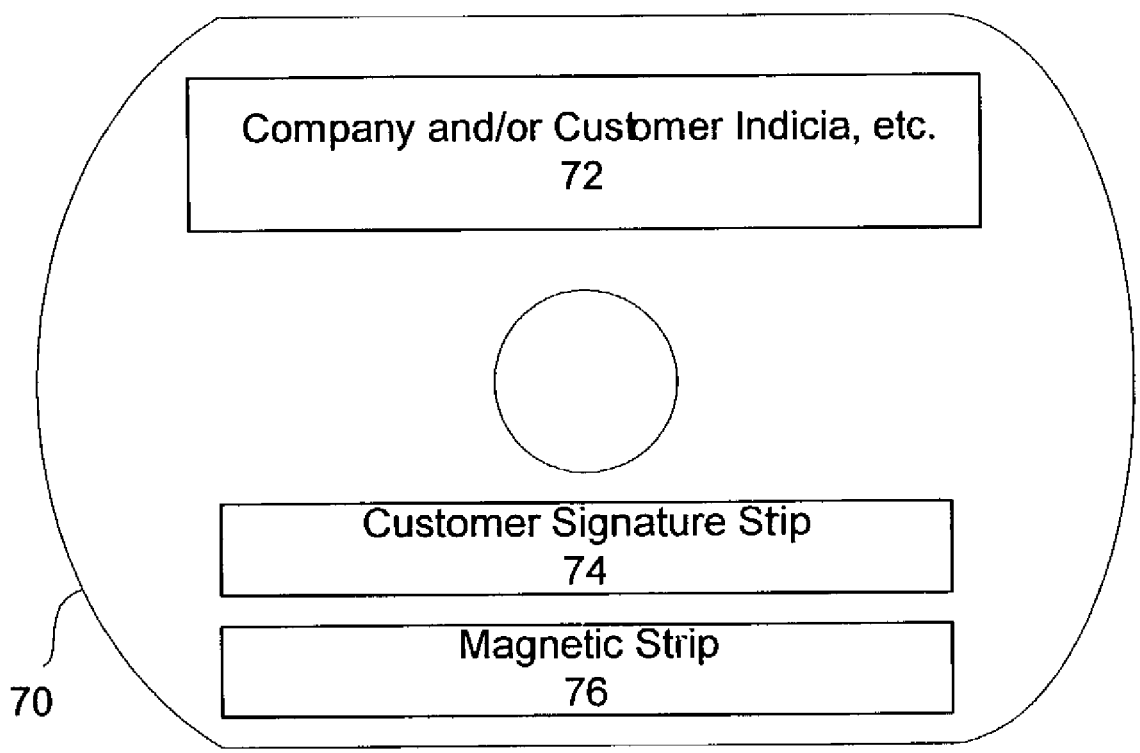
FIG. 7 illustrates an exemplary optical CD that can serve both as a solicitation medium and, upon activation, a financial transaction card, such as a credit card.

FIG. 7 illustrates another exemplary embodiment of an optical CD 70 that can serve as a solicitation medium. However, consistent with an embodiment of the invention, optical CD 70 can serve not only as a solicitation medium, but also can function as an actual financial transaction card, such as a credit card or debit card. Such an approach can reduce the typical costs associated with using printed solicitation materials and/or issuing a separate transaction card, such as a plastic credit card or debit card member.

As shown in FIG. 7, the exemplary computer readable medium is symmetrical in shape and includes a number of areas on the non-readable surface side of the optical CD 70. The recordable surface of CD 70 may be formed on the opposite side of the CD (not shown). The areas provided on the non-readable surface may include a printed area 72 including, for example, the company name or logo and/or the name of the customer. A magnetic strip 76 may also be provided on the surface of the optical CD to permit the reading of pertinent account information during transactions by a conventional magnetic strip reader. Authentication information may also be provided, such as a customer signature strip 74. Alternatively, or in addition, a picture image of the customer (not shown) may be printed on the surface of the optical CD to function, for example, as a means of confirming the customer's identity when using the transaction card.

Figure 8:
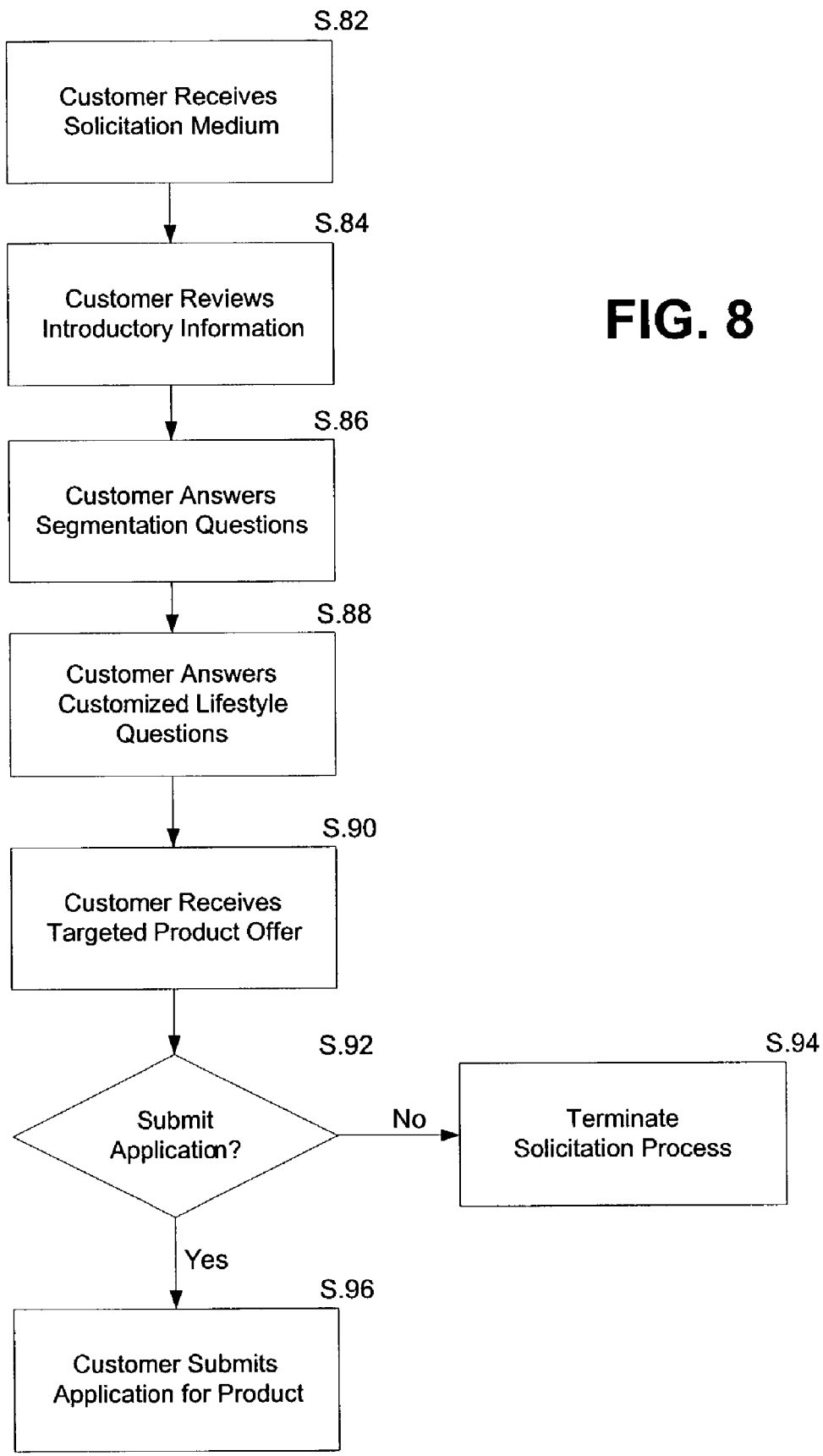
FIG. 8 illustrates a flowchart of an exemplary method of identifying and presenting a product to a customer, in accordance with an embodiment of the invention.

FIG. 8 illustrates another embodiment of the invention. In FIG. 8, a flowchart of an exemplary method for soliciting customers is provided, in which a product is identified and presented to the customer. The embodiment of FIG. 8 may be implemented through logic provided with the solicitation medium, such as software-based logic stored in the computer readable medium. As disclosed herein, solicitation information concerning a plurality or catalog of products may be stored in the computer readable medium. To assist a customer in selecting one or more of the products, the customer may be presented with a set of questions. The answers provided by the customer may be analyzed to identify a product that is best suited or most appropriate for the customer. For purposes of illustration, the embodiment of FIG. 8 will be described with reference to the solicitation of financial product offerings. The embodiment of FIG. 8, however, may be adapted to other types of products, as well as any type of services.

As illustrated in FIG. 8, the process begins when a customer receives the solicitation medium (S). The solicitation medium may be delivered to a customer using a distribution system, such as distribution system 16 (see FIG. 1). When a customer receives the solicitation medium, the customer may review introductory information provided with the solicitation medium (step S.84). In one configuration, the solicitation medium comprises a computer readable medium with introductory information stored thereon. The introductory information may comprise an overview of the solicitation, a set of instructions and/or other introductory information. In another embodiment, the introductory information is provided in whole or in part with printed materials distributed with the computer readable medium. In still another embodiment, the introductory information is provided in both forms, that is in printed form on a letter, flyer or the like, as well as electronic form stored in the computer readable medium.

In addition to the introductory information, the solicitation medium includes solicitation information. In the embodiment of FIG. 8, the solicitation information comprises offers relating to a plurality of products or services, such as a plurality of financial products offered by a financial entity. An overview of the plurality of financial product offerings may be provided as part of the introductory information. To select a particular product, the customer may be given the option to use the logic of the computer readable medium to identify a product and going through an interactive question and answer session. If the customer needs assistance in selecting a product, then the customer may first be presented with a set of segmentation questions (S.86). Generally, the set of segmentation questions may be used to identify which customer segment(s) the customer belongs to or is best matched with. In one embodiment, the computer readable medium comprises software-based logic or program instructions for causing the customer's computer or other suitable device(s) to prompt and collect answers from the customer for a set of segmentation questions. By way of non-limiting example, the segmentation questions may prompt the customer to provide answers concerning the customer's age, income, marital status, gender, education, profession or occupation, home ownership and/or other relevant segmentation information. The answers provided by the customer may be analyzed to confirm that valid data is entered. In one embodiment, the customer may be provided with drop-down displays or multiple-choice answers to facilitate the entry of information in response to the questions. Data may be entered by range (e.g., age or income ranges) or category (e.g., professional category).

The answers provided by the customer in response to the set of segmentation question may be analyzed by the logic of the computer readable medium. This analysis may be performed to interpret the answers and determine the segmentation characteristics that are relevant to the customer. In one embodiment, predetermined customer segments may be defined for the product offerings provided in the solicitation. In such a case, the answers provided by the customer may be analyzed to assign the customer to one or more customer segment(s). Alternatively, the answers may be processed to generally interpret the segmentation characteristics of the customer.

As illustrated in FIG. 8, the customer can also be presented with a set of lifestyle questions (S.88). By way of example, the lifestyle questions may prompt the customer to provide information concerning the customer's activities, hobbies, attitudes and/or other lifestyle related questions. The set of lifestyle questions may also attempt to gather psychographic information from the customer that is relevant to the product offerings being solicited. In one embodiment, the set of lifestyle questions that are presented to the customer are selected by the logic of the computer readable medium depending on the customer's answers to the set of segmentation questions. Thus, depending on the customer's segmentation characteristics, particular lifestyle questions may be presented to identify and facilitate the selection among the plurality of product offerings. In another embodiment, regardless of the answers to the segmentation questions, a predetermined set of lifestyle questions may always be presented to the customer. In either case, the answers provided by the customer may be analyzed to confirm that valid data is entered. In addition, the customer may be provided with drop-down displays, multiple-choice answers or other input schemes to facilitate the entry of information in response to the lifestyle questions.

Based on the customer's answers to the segmentation and lifestyle questions, a specific product or set of products is identified and presented to the customer (S.90). The identified product(s) may be selected by the logic of the computer readable medium in response to the answers provided by the customer. In one embodiment, the identified product(s) may correspond to product(s) that the customer is most likely to respond to or request. In another embodiment, a targeted product offer may be presented that is identified by the logic as being the best suited or appropriate for the customer, given the customer's segmentation characteristics and lifestyle profile.

By way of example, assume the plurality of product offerings correspond to a plurality of financial products such as various credit card offerings from a financial entity. The features of each credit card offering may be targeted or more appropriate for different customers depending on their segmentation and lifestyle. For instance, one credit card offering may have features that are advantageous to business executives and other professionals who frequently take business trips. In contrast, another credit card offering may be targeted to college students who have specific purchasing needs (such as textbooks and other supplies) and/or need to build and establish their credit. Still other credit card offerings may have special features or incentives for particular customers, such as customers who enjoy camping or fishing.

In response to the identified product offering(s), the customer may decide whether to submit an application or request the offered product (S.92). If the customer wants a product (S.92; Yes), then the customer may submit an application for the identified product offering (S.96). As disclosed herein, the customer may be given numerous options for submitting an application and logic may be provided with the solicitation medium to facilitate completing and submitting the application. If, however, the customer decides that he/she does not want the identified product offering(s) (S.92; No), then the solicitation process may terminate (S.94). The solicitation medium may permit the customer to change their decision and later apply for the product. In such case, the ability to submit an application at a later time may be time restricted or restricted by the number of times that the customer has reviewed and considered the solicitation.

Consistent with embodiments of the invention, the above-described process for identifying a product offering for a customer may be modified or adapted to consider additional or other factors. Such factors may include, for instance, eligibility criteria for product offering, as well as other factors such as the geographic location of a customer. Further, the embodiment of FIG. 8 may be modified so that only segmentation information or only lifestyle information is used to identify a product offering for the customer.

Figure 9:
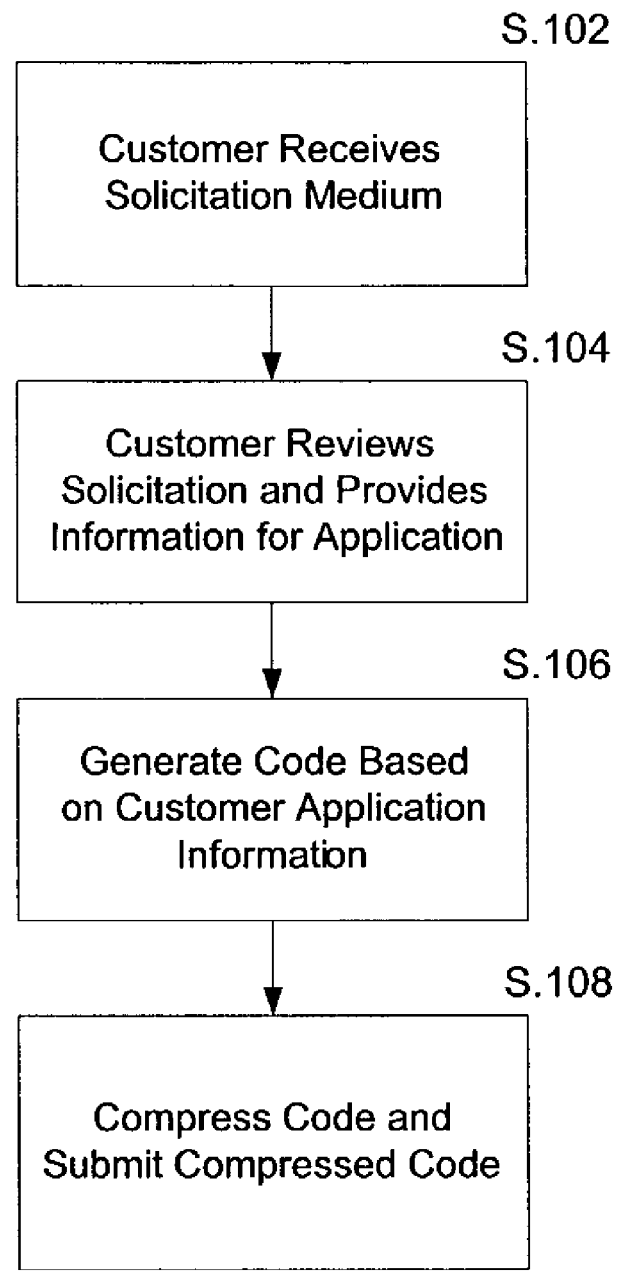
FIG. 9 is a flowchart of an exemplary method for representing application information with a code and compressing the same for purposes of submitting an application, consistent with an embodiment of the invention.

FIG. 9 illustrates a flowchart of another exemplary method, consistent with an embodiment of the present invention. The embodiment of FIG. 9 may be utilized for coding application information and/or encrypting the same. Such an approach can be advantageously used for the purposes of submitting an application or request for an offered product or service. Further, by encrypting the code before submission, a customer's concerns over privacy can be minimized. As can be appreciated by those skilled in the art, the embodiment of FIG. 9 may be combined with the exemplary embodiments disclosed herein for the purposes of soliciting various types of product(s) or service(s), including financial product(s) or service(s).

As shown in FIG. 9, the process begins when a customer receives the solicitation medium (S.102). With the solicitation medium, the customer may review the solicitation for the product or service offering(s), and decide to submit application for an offered product or service (S.104). As disclosed herein, a customer may submit an application by responding to questions or electronically filling-in an application using a computer at the customer's location. Advantageously, the computer readable medium provided with the solicitation may include pre-stored client information and logic for facilitating the gathering and completion of the application information for an offered product or service.

In the embodiment of FIG. 9, the computer readable medium may also include logic for generating a code based on the customer's application information (S.106). The code may be a numeric or alpha-numeric code. Such a code may include a number of code portions, including a client code portion that uniquely identifies the customer and one or more other code portions that identify the product or service selected by the customer and other customer application information. In one embodiment, the code may be generated as a data string that comprises the appended customer application information, such as "JohnSmith1311raintreeDrRichmondVA 23229yes yesnodogsskiing$120000professoryes." Other conventional data structures may also be used to generate the code, such as a linked list or array. Customer application information may also be converted into a binary code to generate the original code.

After the original code is generated, the code may be compressed before the application information is submitted (S.108). In one embodiment, the compression of the code may be performed using an encryption routine that is executed based on logic or program instructions of the computer readable medium. By way of example, conventional encryption routines may be utilized to compress the original code (such as a 30 bit code) into a compressed code (such as a 15-20 bit code). For example, the code "JohnSmith1311raintreeDrRichmondVA23229yesyesnodog sskiing$120000 professornoyes" could be converted into a compressed code, such as "12Wdsjh766%4$22 cmlxxsr." For this purpose, conventional compression or encryption routines may be provided, such as conventional 128 bit encryption techniques, as well as logical rules based encryption techniques.

By employing the embodiment of FIG. 9, a compressed code may be displayed to the customer so that it can be orally given to a service representative during a call to submit the application information. The compressed code may be entered by the service representative into a computer, and then decompressed or decrypted to reveal the original code. The compressed code could also be written on a form that is mailed or returned by the customer (using, for example, distribution system 16 of FIG. 1) or transmitted over a network (such as network 18 of FIG. 1) with reduced risk of information theft for the customer and the company. In either case, the original code can be determined and forwarded to server 22 for processing to determine the identity of the customer and analyze the pertinent application information.

While embodiments of the invention have been described with reference to an optical CD, other types of computer readable media may be utilized. For example, a smart card may be used as a solicitation media to present offers to customers. The smart card may interface with a conventional smart card reader to display offers, for example, on the display of the customer's computer. A smart card can also be used as a financial transaction card by, for example, providing the appropriate logic in the card and printing any necessary information on a surface of the card. A conventional smart card interface may be used to permit reading of the card during transactions. Alternatively, or in addition, the smart card may be provided with a magnetic strip to permit the reading of pertinent information from the card during a transaction.

Embodiments of the invention to provide a general or non-specific offer for products or services of an entity. For instance, instead of providing an offer for a specific credit card product or identifying a specific credit card product in response to answers provided by a customer, the solicitation medium may include a general offer for a customer to submit an application for a credit card from a financial entity. In such a case, the application information from the customer may be processed by decision logic of server 22 to identify a specific credit card that the customer is qualified to receive. The terms and condition of the credit card (such as credit limit, APR, etc.) may determined as part of this process and subsequently communicated to the customer upon approval.

Further, as can be appreciated by those skilled in the art, embodiments of the present invention are not limited credit card products. Other financial products may be offered and issued, in accordance with the teachings of the disclosed embodiments. For instance, debit card, cash cards, or pre-loaded cards may be offered to customers using the solicitation media of the invention. Moreover, in the context of a computer readable medium that functions both as a solicitation tool and a financial transaction card, the computer readable medium may be adapted to function in transactions as a debit card, cash card or pre-loaded card.

Other modifications and embodiments of the present invention will be apparent to those skilled in the art from consideration of the specification and practice of the invention disclosed herein. For example, one skilled in the art will appreciate that the disclosed systems and methods may be distributed among various components and/or over various computers. Additionally, the information presented to customer may be provided entirely through a computer readable medium or in combination with other sources or materials, such as through a Web page or printed material(s) distributed with the solicitation medium. Further, the disclosed methods may be modified to change the order of the disclosed steps or to add steps to and/or delete steps from the disclosed methods.

While certain embodiments of the invention have been disclosed with, reference to financial products or services, systems and methods consistent with embodiments of the invention may be adapted for soliciting other types of products or services. For instance, the offered product(s) or service(s) may encompass consumer merchandise or services, food products or services, automotive products or services, insurance products or services, travel or leisure products, as well as virtually any other type of product or service. Further, financial product(s) or service(s) that can be used with embodiments of the invention are not limited to credit card products. Examples of financial product(s) or service(s) that are applicable to the invention include, for instance, savings accounts, checking accounts, loans of any and all types, mortgages, investment products or services, certificates of deposit, bonds, futures, securities, commodities, as well as other any other type of financial product or service.

Therefore, it is intended that the specification and disclosed embodiments be considered as exemplary only, with a true scope and spirit of the invention being indicated by the full literal scope and equivalents of the following claims.

What is claimed is:

1. A computer readable medium for distribution to a customer, the computer readable medium storing program instructions for instructing a computer to perform a method of offering at least one credit card product to the customer, the method comprising:
   presenting an offer for at least one credit card product to the customer;
   receiving a request from the customer to apply for the offered credit card product; and
   in response to receiving the request for the customer, electronically submitting an application for the credit card product to a financial entity;
   wherein the computer readable medium comprises a non-recordable surface with pre-assigned account information printed thereon so that the computer readable medium may function as a transaction card when an account for the offered credit card is issued to the customer using the pre-assigned account information.

2. The computer readable medium according to claim 1, wherein the computer readable medium further comprises a magnetic strip formed on the non-recordable surface of the computer readable medium, the magnetic strip storing a pre-assigned account number for the offered credit card.

3. The computer readable medium according to claim 1, wherein the computer readable medium further comprises a signature strip formed on the non-recordable surface of the computer readable medium, the signature strip being signed by the customer when an account for the offered credit card is issued.

4. The computer readable medium according to claim 1, wherein the computer readable medium is one of an optical compact disk (CD) and a smart card.

5. The computer readable medium according to claim 1, wherein the computer readable medium further comprises program instructions for instructing the computer to present a plurality of credit card offerings to the customer.

6. The computer readable medium according to claim 5, wherein the computer readable medium further comprises program instructions to instruct the computer to analyze and identify at least one of the plurality of product offerings for the customer.

7. The computer readable medium according to claim 5, wherein the computer readable medium further comprises program instructions to instruct the computer to perform a method comprising:
   presenting the plurality of product offerings to the customer;
   gathering at least one of segmentation and lifestyle information from the customer; and
   analyzing the information gathered from the customer to identify at least one of the plurality of product offerings for the customer.

8. The computer readable medium according to claim 7, wherein the method further comprises:
   presenting the identified product offering to the customer.

9. The computer readable medium according to claim 1, wherein the computer readable medium further comprises program instructions to instruct the computer to perform an expiration routine which invalidates the computer readable medium after a predetermined time period.

10. The computer readable medium according to claim 1, wherein the computer readable medium further comprises program instructions to instruct the computer to perform an expiration routine which invalidates the computer readable medium after a predetermined number of uses.

11. A method for soliciting a product to a customer, the method comprising:
providing a computer readable medium, the computer readable medium storing information related to a plurality of product offerings and storing program instructions for selecting a product offering for a customer;
enabling a computer to read the information stored in the computer readable medium and present the plurality of product offerings to the customer;
further enabling the computer to gather at least one of segmentation and lifestyle information from the customer;
configuring the program instructions stored in the computer readable medium to cause the computer to analyze the information gathered from the customer and identify at least one of the plurality of product offerings;
further enabling the computer to present the identified product offering to the customer,
wherein preparing the computer readable medium further comprises storing on the computer readable medium an application for requesting at least one of the product offerings;
receiving from the customer a request for the identified product offering, the request from the customer including application information submitted based on the application stored on the computer readable medium;
processing the application information to determine whether to approve the customer's request for the identified product offering; and
notifying the customer whether the request for the product offering is approved,
wherein the identified product offering is a credit card product; and
wherein preparing the computer readable medium further comprises providing a magnetic strip on a non-recordable surface of the computer readable medium and storing a pre-assigned account number on the magnetic strip, whereby the computer readable medium may function as a transaction card when an account for the credit card is issued to the customer based on the pre-assigned account number.

12. The method according to claim 11, wherein preparing the computer readable medium further comprises printing account indicia on the non-recordable surface of the computer readable medium.

13. The method according to claim 11, wherein the computer readable medium is an optical compact disk (CD).

14. The method according to claim 11, wherein the computer readable medium is a smart card.

15. A method for soliciting a financial product to a customer, the method comprising:
preparing a computer readable medium, the preparation of the computer readable medium including storing on the computer readable medium solicitation information for at least one financial product and an application for requesting the financial product, and providing account indicia on a surface of the computer readable medium that is associated with the at least one financial product;
distributing the computer readable medium to a customer;
receiving from the customer a request for the financial product, the request from the customer including application information submitted based on the application stored on the computer readable medium;
processing the application information to determine whether to approve the customer's request for the financial product; and
notifying the customer whether the request for the financial product is approved.

16. The method according to claim 15, wherein preparing the computer readable medium further comprises storing on the computer readable medium information related to a plurality of product offerings.

17. The method according to claim 16, wherein preparing the computer readable medium further comprises storing program instructions on the computer readable medium, the program instructions including program instructions for instructing a computer of the customer to perform predetermined functions.

18. The method according to claim 17, wherein the program instructions include program instructions to instruct the computer of the customer to analyze and identify at least one of the plurality of product offerings for the customer.

19. The method according to claim 17, wherein the method further comprises:
using the computer of the customer to read the information stored on the computer readable medium and present the plurality of product offerings to the customer;
further using the computer to gather at least one of segmentation and lifestyle information from the customer; and
applying the program instructions stored on the computer readable medium to cause the computer to analyze the information gathered from the customer and identify at least one of the plurality of product offerings for the customer.

20. The method according to claim 19, wherein the method further comprises:
further using the computer to present the identified product offering to the customer.

21. The method according to claim 15, wherein preparing the computer readable medium further comprises providing a magnetic strip on a surface of the computer readable medium and storing a pre-assigned account number on the magnetic strip, whereby the computer readable medium may function as a transaction card when an account for the requested financial product is issued to the customer based on the pre-assigned account number.

22. The method according to claim 21, wherein the offered financial product is one of a credit card and a debit card.

23. The method according to claim 22, wherein the computer readable medium is an optical compact disk (CD).

24. The method according to claim 22, wherein the computer readable medium is a smart card.

25. A system for soliciting a financial product to a customer, the system comprising:
a solicitation media generator for preparing a computer readable medium, the solicitation media generator being adapted to store on the computer readable medium solicitation information for at least one financial product and an application for requesting the financial product, and to form account indicia on a surface of the computer readable medium, the account indicia being associated with the at least one financial product;
a distribution system for distributing the computer readable medium to a customer; and a server system coupled to the solicitation media generator and the distribution system, wherein the server system is configured to:

receive from the customer a request for the financial product, the request from the customer including application information submitted based on the application stored on the computer readable medium;

process the application information to determine whether to approve the customer's request for the financial product; and notify the customer whether the request for the financial product is approved.

26. The system according to claim 25, wherein the solicitation medium generator is further adapted to store on the computer readable medium information related to a plurality of product offerings.

27. The system according to claim 25, wherein the solicitation medium generator is further adapted to store program instructions on the computer readable medium, the program instructions including program instructions for instructing a computer of the customer to perform predetermined functions.

28. The system according to claim 27, wherein the program instructions include program instructions to instruct the computer of the customer to analyze and identify at least one of the plurality of product offerings for the customer.

29. The system according to claim 27, wherein the program instructions instruct the computer of the customer to perform a method comprising:

reading the information stored on the computer readable medium and presenting the plurality of product offerings to the customer;

gathering at least one of segmentation and lifestyle information from the customer; and analyzing the information gathered from the customer to identify at least one of the plurality of product offerings for the customer.

30. The system according to claim 29, wherein the method further comprises:

presenting the identified product offering to the customer.

31. A CD transaction card product, comprising an optical CD for storing program instructions for instructing a computer to perform a method of offering financial products to a customer, the method comprising:

presenting an offer for at least one financial product to the customer;

receiving a request from the customer to apply for the offered financial product; and in response to receiving the request for the customer, electronically submitting an application for the financial product to a financial entity;

wherein the optical CD comprises a non-recordable surface with pre-assigned account information printed thereon so that the optical CD may function as a transaction card when an account for the offered financial product is issued to the customer using the pre-assigned account information.

32. The CD transaction card product according to claim 31, wherein the optical CD further comprises a magnetic strip formed on the non-recordable surface of the computer readable medium, the magnetic strip storing a pre-assigned account number for the offered financial product.

33. The CD transaction card product according to claim 31, wherein the optical CD further comprises a signature strip formed on the non-recordable surface of the optical CD, the signature strip being signed by the customer when an account for the offered financial product is issued.

* * * * *